United States Patent
Wase

(10) Patent No.: US 11,934,085 B2
(45) Date of Patent: Mar. 19, 2024

(54) CAMERA MOUNTING POST

(71) Applicant: Topgolf Sweden AB, Danderyd (SE)

(72) Inventor: Lars Wase, Danderyd (SE)

(73) Assignee: Topgolf Sweden AB, Danderyd (SE)

( * ) Notice: Subject to any disclaimer, the term of this patent is extended or adjusted under 35 U.S.C. 154(b) by 0 days.

(21) Appl. No.: 18/167,805

(22) Filed: Feb. 10, 2023

(65) Prior Publication Data

US 2023/0259009 A1 Aug. 17, 2023

(30) Foreign Application Priority Data

Feb. 17, 2022 (SE) .................................. 2250164-7

(51) Int. Cl.
| | |
|---|---|
| *G03B 17/56* | (2021.01) |
| *E04H 12/00* | (2006.01) |
| *G06F 1/20* | (2006.01) |
| *H05K 7/20* | (2006.01) |

(52) U.S. Cl.
CPC ......... *G03B 17/561* (2013.01); *E04H 12/003* (2013.01); *G06F 1/20* (2013.01); *H05K 7/20127* (2013.01); *H05K 7/20136* (2013.01)

(58) Field of Classification Search
CPC .... G03B 17/56; G03B 17/561; E04H 12/003; H05K 7/20136; H05K 7/20127; G06F 1/20
See application file for complete search history.

(56) References Cited

U.S. PATENT DOCUMENTS

| | | | |
|---|---|---|---|
| 4,051,525 A | 9/1977 | Kelly | |
| 6,380,909 B1 * | 4/2002 | Wilkinson | .............. E04H 12/08 |
| | | | 343/890 |
| 11,355,904 B1 * | 6/2022 | Bronson | ................... H02G 7/20 |
| 2010/0155549 A1 | 6/2010 | Robinson | |
| 2014/0247542 A1 | 9/2014 | Fong et al. | |
| 2018/0172229 A1 | 6/2018 | Lockwood et al. | |

(Continued)

FOREIGN PATENT DOCUMENTS

| | | | |
|---|---|---|---|
| AU | 2015221469 | 3/2016 | |
| AU | 2021107429 | 12/2021 | |
| EP | 3654098 A1 * | 5/2020 | ............... B64B 1/44 |

(Continued)

OTHER PUBLICATIONS

Office Action in Swedish Appln. No. 2250164-7, dated Dec. 15, 2022, 33 pages.

(Continued)

*Primary Examiner* — Clayton E. LaBalle
*Assistant Examiner* — Fang-Chi Chang
(74) *Attorney, Agent, or Firm* — Fish & Richardson P.C.

(57) ABSTRACT

A post for mounting a camera comprises a base, a tube mast, and a camera mount arranged to hold one or more cameras. A proximal end of the tube mast is connected to the base and a distal end of the tube mast is connected to the camera mount. The invention is characterised in that the base is arranged to comprise computing equipment, from which computing equipment wiring runs through the tube mast to the camera mount, and in that the base and computing equipment are encased by a cabinet configured to protect the computing equipment from exposure to weather. The invention also relates to a method for installing a post.

8 Claims, 7 Drawing Sheets

(56) References Cited

U.S. PATENT DOCUMENTS

2021/0131629 A1    5/2021   Bembridge et al.

FOREIGN PATENT DOCUMENTS

| GB | 2337538 | | | 11/1999 | | |
|---|---|---|---|---|---|---|
| GB | 2435273 | A | * | 8/2007 | ............ | F21L 14/00 |
| KR | 101437794 | | | 9/2014 | | |
| KR | 20210060687 | A | * | 5/2021 | | |
| WO | WO 2015/082934 | | | 6/2015 | | |
| WO | WO 2015/183925 | | | 12/2015 | | |
| WO | WO 2019/043046 | | | 3/2019 | | |
| WO | WO 2019/092273 | | | 5/2019 | | |
| WO | WO-2021089712 | A1 | * | 5/2021 | .......... | E04H 12/003 |

OTHER PUBLICATIONS

Office Action in Swedish Appln. No. 2250164-7, dated Sep. 2, 2022, 5 pages.
Search Report in Swedish Appln. No. 2250164-7, dated Sep. 2, 2022, 3 pages.
International Search Report and Written Opinion in International Appln. No. PCT/EP2023/053645, dated Jun. 28, 2023, 15 pages.
International Search Report and Written Opinion in International Appln. No. PCT/EP2023/053650, dated Jun. 28, 2023, 17 pages.

* cited by examiner

CAMERA MOUNTING POST

BACKGROUND

The present invention relates to a method for mounting a camera to a post, and in particular for mounting a camera to a post to be used in an outdoor environment, such as a driving range, tournament range or a golf course. The invention also relates to such a post.

Cameras are often used at driving ranges and golf courses, for example, at grass tees, for purposes of tracking the trajectory of a golf ball as the golfer hits the ball from the tee towards the target. To get a good field of view, the cameras are typically mounted on top of a post, which may have a height of upwards six meters, although most commonly, the cameras are mounted approximately four meters above ground. This allows the cameras a field of view that is unobstructed from the golfer herself. The higher location of the cameras also enables better Wi-Fi reception, where applicable.

SUMMARY

Given the outdoor environment and use of the cameras, there are certain demands and/or desirable properties that are associated with the cameras and poles. For example, the poles need to be safe, sturdy, be able to reliably maintain the camera direction, and also be quick, easy, and reliable to install.

Furthermore, as cameras become more sophisticated and collect more data, the need for quick and efficient processing of the data increases. It would therefore also be desirable to move some of the image and data processing equipment physically closer to the cameras so as to increase the local processing power, rather than relying on a central processing location. However, moving computing equipment to an outdoor environment poses several challenges, as most computing equipment is not designed to withstand outdoor weather conditions.

The various embodiments of the present invention solve these problems.

Hence, in one aspect, the invention relates to a post for mounting a camera, which post comprises a base, a tube mast, and a camera mount arranged to hold one or more cameras, wherein a proximal end of the tube mast is connected to the base and a distal end of the tube mast is connected to the camera mount. The post is characterised in that the base is arranged to comprise a piece of computing equipment, from which computing equipment wiring runs through the tube mast to the camera mount, and that the base and computing equipment are encased by a cabinet configured to protect the computing equipment from exposure to weather. It should be noted that the cabinet does not need to be completely weatherproof, as the computing equipment typically has an IP Code or Ingress Protection Code classification of at least IPx4 according to the IEC 60529 standard, i.e., it can withstand water splashing against the enclosure of the computing equipment from any direction without any harmful effect.

By including the computing equipment inside the base, encasing it with a cabinet, and running the wiring inside the tube mast from the computing equipment to the camera mount, it is possible to achieve the goal of distributed computing, and at the same time minimize the risk of the computing equipment getting damaged, either from weather conditions, or from animals, insects, etc. In addition, as will be seen from the description below, the configuration of the base, cabinet, etc., is such that it is easy for a technician to install, configure and service the computing equipment.

In some embodiments the base is a steel base configured to attach to a foundation through adjustable attachment members that ensure the post is installed in a vertically aligned position. The adjustable attachment members will be described in further detail below. Even though it is not a determining factor for the stability of the post, having a heavy base contributes to the stability of the post. It should be noted that steel is merely one of many materials that can be used here. Essentially any heavy weight material that allows for attaching computing equipment can be used in various embodiments. This being said, it should also be noted that there are other practical considerations that need to be considered by the skilled artisan when deciding on how heavy the base should be, such as the cost of the material per kilo, the complexity of transportation and/or installation of the base, etc. Thus, in most embodiments the stability of the post is not solely dependent on the weight of the base.

In some embodiments the base comprises two or more flanges arranged around a central base tube and wherein the computing equipment is arranged to be mounted onto a pair of the two or more flanges. The flanges taper off along the height of the base such that they are wider at the bottom of the base and narrower at the top of the base, thereby creating an overall conical, pyramid-like, or tetrahedral appearance of the base. This general shape ensures that the bottom of the base is wider than the top of the base, to which the tube mast connects, thereby enhancing the stability of the pole in its assembled position while not adding unnecessary weight to the construction. The flanges provide a convenient way of mounting computing equipment, which generally has flat surfaces, to the post, which generally has a round cross section and thus a curved surface. However, it should be noted that the post does not necessarily need to have a round cross section. There may be embodiments in which the cross section is polygonal, such as square, rectangular, or hexagonal, for example, and the computing equipment can be mounted directly onto the post without the use of flanges. A combination of a round-cross-section post and flanges mounted perpendicularly to the round post surface, however, provides a construction that can withstand large wind forces while still allowing the convenient mounting of computer equipment.

In some embodiments, the base comprises four flanges. This allows the computing equipment to be mounted on pairwise flanges, and for the computing equipment to be located in between the flanges. However, it should be noted that this may also be accomplished with fewer flanges, such as three flanges, or with more flanges, such as six or eight flanges in various embodiments. The exact number of flanges can be determined by a person having ordinary skill in the art and is generally a decision that is made based on factors such as the stability of the post, how the available space between the flanges accommodates the computing equipment, and cost and complexity of manufacturing and installing the base.

In some embodiments, the flanges are arranged to hold the computing equipment via brackets. The brackets can be securely attached to the flanges and provide a flat surface that allows for simple installation of the computing equipment.

In some embodiments, the brackets of at least one piece of computing equipment are arranged to be mounted onto two adjacent flanges. Again, this enables secure attachment and creation of a flat surface that allows for simple installation of the computing equipment, compared to if the computing equipment had been installed on a single flange.

In some embodiments, the cabinet has two or more sections, allowing the cabinet to be wrapped around the base and tube mast, and the two or more sections are configured to be securely attached to one another to prevent the cabinet from being opened unintentionally. This creates a protected environment around the computing equipment, while at the same time being easy to open by service technicians. The secure attachment of the two sections to one another can be accomplished by any conventional locking mechanism.

In some embodiments, the post comprises a periphery sealing gasket arranged between the tube mast and the cabinet to reduce the moisture inside the cabinet and the base. As the post typically is installed in an outdoor environment, were there may be rain and/or snow from time to time, and even though the computing equipment typically has an IP×4 rating or higher, as was described above, it is desirable to reduce the moisture inside the cabinet. A periphery sealing gasket between the tube mast and cabinet can serve to accomplish this purpose.

In some embodiments, the proximal end of the tube mast is connected to the base via hinges, allowing folding of the tube mast relative to the base. The hinges make it possible to perform the installation of the tube mast, cameras, etc. at ground level, and fold the tube mast up to a vertical position and secure it to the base. Raising the tube mast can be done, for example by using ropes, machinery, hydraulic equipment, or manual power, which is significantly easier compared to other alternatives in which the tube mast has to be completely separated from the base during installation and repair.

In some embodiments, the base comprises at least one air passage and the distal end of the tube mast comprises at least one ventilation hole for creating an upwards airflow from the base through the tube mast, in order to achieve passive cooling of the computing equipment. As is well known, computing equipment generates heat when in use. The heat inside the cabinet may also increase due to hot temperatures outside and/or sunlight hitting the cabinet. Therefore, it is important to have proper ventilation inside the cabinet to cool the inside so it is kept at a temperature at which the computing equipment can operate properly. Often passive cooling, as a result of air moving past the computing equipment, is sufficient. The air movement is typically a result of hot air rising and (possibly cooler) air being pulled in from ground level rising is sufficient.

In some embodiments, the post includes a fan arranged to provide an upwards airflow from the base through the tube mast to actively cool the computing equipment. This may be preferable when passive cooling is insufficient. Depending on the specific embodiment at hand, the fan can be installed in the base or in the distal end of the tube mast. Regardless of the specific position of the fan, the same effect of moving cooler air from the bottom of the post towards the top of the post, and thereby cooling the computing equipment, can be achieved.

In some embodiments, the camera mount comprises one or more arms arranged to hold the one or more cameras and allow for angular turning and tilting of the one or more cameras. This creates great flexibility in terms of how many cameras can be installed at the top of the post, and in which direction the various cameras should point to achieve the best field of view.

In some embodiments, the minimum length of the tube mast is greater than 2 meters, and preferably greater than 3.5 meters, and the maximum length of the tube mast is less than 8 meters, and preferably less than 6 meters. These ranges of sizes have been discovered to be the most useful ones, particularly in the context of a golf course, to get the best field of view, as cameras at that height will not be blocked by golfers or their clubs.

In some embodiments, the tube mast is made of a light-weight material. Some examples include aluminium, plastic, carbon fiber, filament-wound glass fiber or other composite material. This allows the tube mast to be easy to manipulate during installation and repair, while at the same time being sufficiently strong to support the weight of the cameras, yet not heavy such that the stability of the post is compromised, even during high winds. It is noted that there are many options that can be chosen to fulfil these criteria, and which can be selected by a person having ordinary skill in the art. However, it should also be noted that there are circumstances in which such light-weight materials may not be able to fulfil certain performance requirements, and in those cases, heavier materials, such as steel, may be used for the tube mast. For example, one set of current requirements stipulate that the camera movement cannot exceed 0.067 degrees at a wind speed of 15 m/s. This may limit the range of available materials for the tube mast. However, as camera stabilization technologies improve, this requirement may be relaxed, thereby enabling the use of other materials. Again, such considerations fall within the capabilities of the person having ordinary skill in the art.

In some embodiments, the wiring includes a coaxial cable, an ethernet cable, or both. Coaxial cables are common in the context of camera installations, as are ethernet cables. In some embodiments, power to the cameras can be provided through a conventional power cable (e.g., a 230V or 110V AC cable). When such a dedicated power cable is used, the power cable typically runs inside its own conduit inside the tube mast to stay separate from the coaxial and/or ethernet cables. In some embodiments that use low power cameras, the ethernet cables are used to provide power (i.e., power over ethernet, PoE, cables). This makes it possible to avoid dedicated AC power cables and a conduit inside the post, which facilitates installation and improves safety.

In some embodiments, the central base tube connects to the tube mast to form a continuous tube for the wiring from the computing equipment to the camera mount. This minimizes the risk of various types of debris and insects, etc., ending up inside the tube and creates a smooth and uniform space for the wiring all the way from the bottom to the top of the pole, minimizing the risk of kinks etc. in the wiring. It also provides both an uninterrupted vertical passage for said cooling air flow, as well as a longer total vertical chimney, effectively increasing the chimney effect since a larger volume of air inside the tube mast is heated and creates a larger air flow.

In some embodiments, the central base tube further comprises through holes for wiring connecting to the computing equipment. These through holes create a simple path for the wiring from the computing equipment, which is mounted on the outside of the central base tube, to the inside of the central base tube, and the diameter of the holes can be adapted to create an opening that is neither too large nor too small for the wiring that is used between the camera and the computing equipment. Such cables can then run, via the tube, upwards to the camera equipment and downwards for connection of the post to peripheral equipment and/or power supply, via a bottom opening in the tube and a ground or underground line.

In some embodiments the plurality of flanges is provided on an envelope surface of the central base tube. As was noted above, having the flanges as part of the envelope surface, as opposed to detachable flanges that are connected using some sort of attachment members, creates a sturdier base for the post.

In some embodiments, the base is heavier than the tube mast, camera mount, and the one or more cameras combined, to increase the stability of the post in its assembled position. As the skilled person realizes, the heavier the base is, the lower the center of gravity will be for the post, and the less likely the post will be to tip over if the post is subjected to some sideways force from wind, animals, people, golf equipment, or even a golf cart. Thus, the bigger the ratio between the weight of the base and the weight of the tube mast and camera, the less likely the post is to topple over. However, as discussed above, the weight of the base is merely one out of many factors that affects stability, and that there may be practical considerations, such as cost, transportation- and installation, etc., which limits how heavy the base can be.

In another aspect, the invention relates to a method for installing a post of the above-described type for mounting a camera, which method comprises the steps of: installing and levelling the base onto a foundation; attaching the proximal end of the tube mast to the base;

and connecting the one or more cameras to the wiring. The method is characterised in that the one or more cameras and the wiring are connected while the tube mast is resting on the ground in an essentially horizontal position, and further comprises the steps of: raising the tube mast to a vertical position; installing computing equipment at the base and connecting the computing equipment to the wiring; and encasing the base and computing equipment by the cabinet.

As was mentioned above, the use of hinges to connect the tube mast to the base makes it possible to easily position the post in a horizontal position, in which installation and repair of computing equipment, wiring, and/or cameras can be performed, followed by raising the tube mast into a vertical position. In addition to accomplishing easier installation, it also enhances worker safety for the installers, as they do not need to balance high up on a ladder to perform parts of installation or repair processes, and they can also use a different set of tools and equipment compared to what might be needed when working at a high distance off the ground. Many additional advantages of the installation method correspond to those of the post.

In the following, various embodiments of the invention will be described in detail, with reference to the enclosed drawings. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
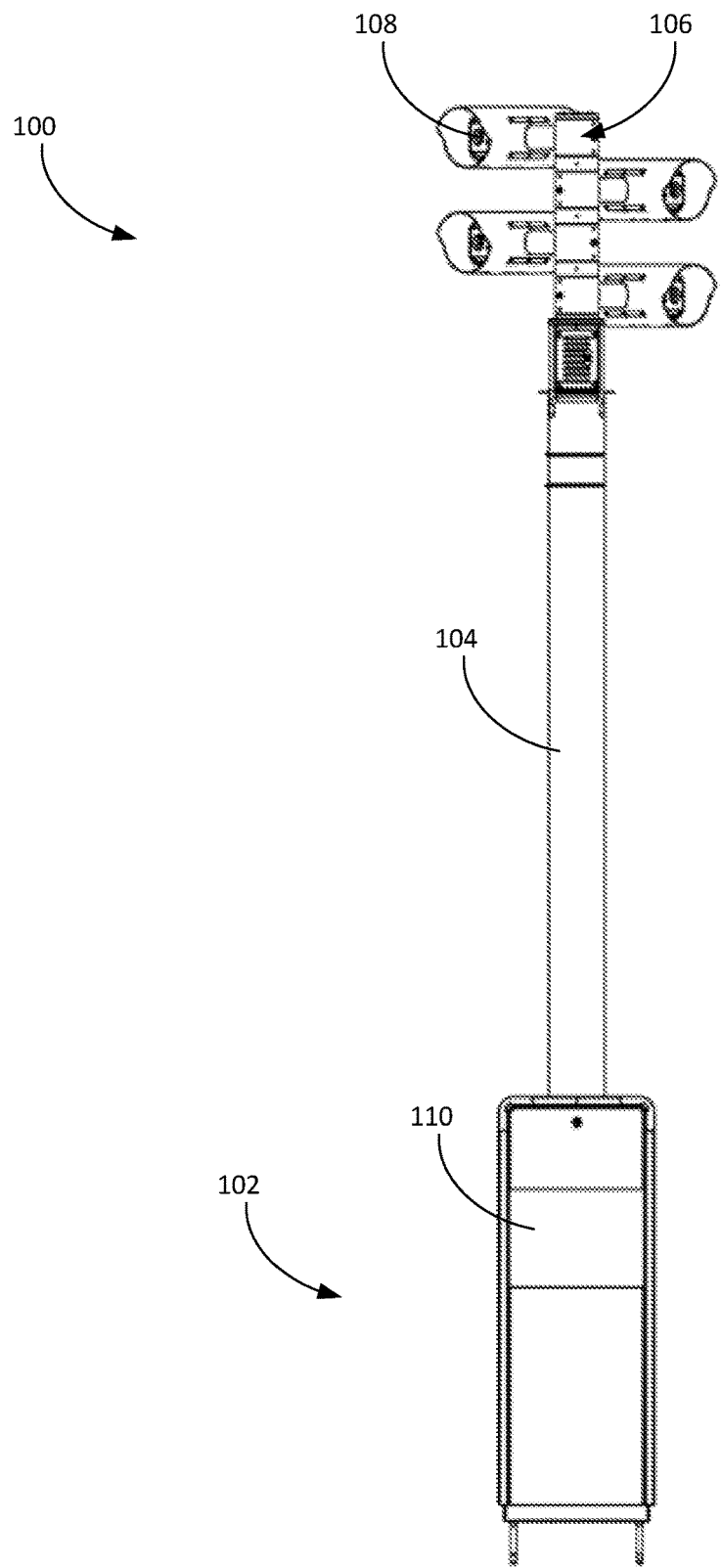
FIG. 1 is a perspective view of a post for mounting a camera, in accordance with one embodiment.

As was described above, a goal with the various embodiments of the invention is to provide a post for one or more cameras, which is suitable for use in an outdoor environment, such as a golf course or a driving range, and which permits computing equipment to be installed and operated properly inside the post, and to be protected both from external weather conditions and from physical impacts or tampering (e.g., from human or animal actions). An additional goal is to have a post that is easy to install and service in a safe manner, and into which computing equipment can easily be installed and maintained, by service technicians.

Various embodiments of the invention will now be described in detail by way of example and with reference to the drawings. It should be noted that for purposes of explanation and simplicity, four cameras and a single piece of computing equipment are shown in the drawings. However, it should be realized that the same principles can be applied to multiple pieces of computing equipment and varying numbers of cameras associated with a single post. Therefore, the example embodiments described herein should not be considered as limiting the invention to these embodiments, but the invention is defined by the appended claims.

FIG. 1 shows a post 100 for mounting a camera, in accordance with one embodiment. The post 100 is generally anywhere between two and eight meters in height. As can be seen in FIG. 1, the post 100 includes a base 102, a tube mast 104, and a camera mount 106 arranged to hold one or more cameras 108. The base 102 is arranged to contain computing equipment inside a cabinet 110, as will be described in further detail below and with reference to FIG. 4. Wiring runs inside the tube mast 104 from the computing equipment to the camera mount 106, where it is connected to the cameras 108. As was noted above, power cables are typically separate from any other wiring, inside a dedicated conduit, as will be described below with reference to FIG. 5. Wiring to the computing equipment typically comes into the base 102 from a trench in the ground. As was mentioned above, by including the computing equipment inside the base 102, and encasing it with a cabinet 110, and running the wiring inside the tube mast 104, it is possible to achieve the goal of distributed computing, and at the same time minimize the risk of the computing equipment getting damaged, either from weather conditions, or from animals, insects, etc.

Figure 2:
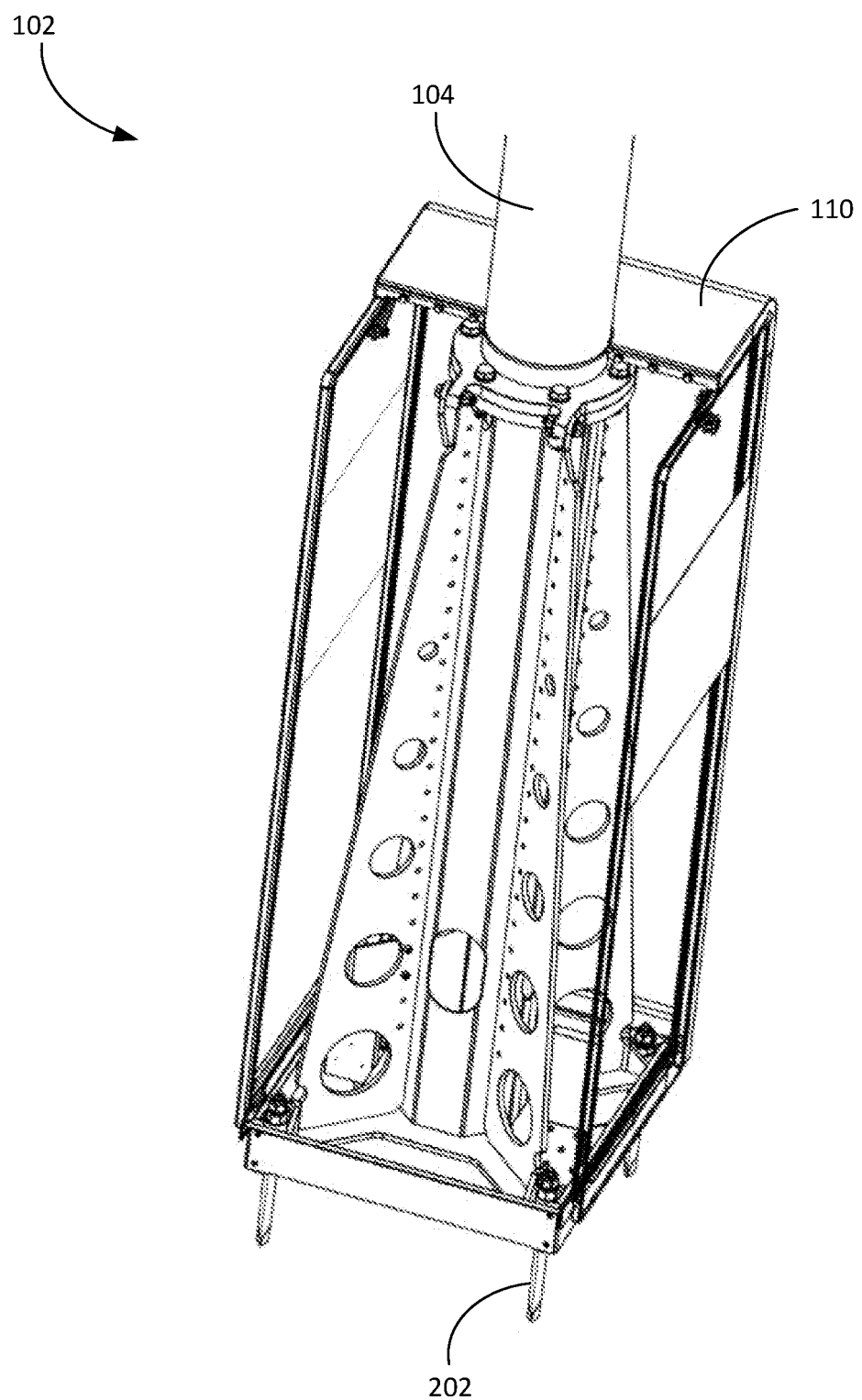
FIG. 2 is a perspective view of a base of the post in FIG. 1 installed inside a cabinet, in accordance with one embodiment.

FIG. 2 shows a detailed perspective view of the base 102 installed inside the cabinet 110, with a portion of the cabinet 110 removed. The base 102 is pyramid-shaped and manufactured from steel (e.g., stainless steel) or some other heavy material and is arranged to be attached to a foundation (not shown), such as a concrete foundation at ground level, by a set of adjustable attachment members 202. For example, in some embodiments, bolts are anchored into the foundation, spacers are placed on the bolts, and the base 102 and cabinet are placed on top of the spacers and secured with nuts. Many types of adjustable attachment members 202, such as various types of bolts and screws, appropriate for use with a foundation are available to those having ordinary skill in the art and can be selected based on the particular circumstances at hand. The common property of such adjustable attachment members is that they ensure secure attachment of the base 102 to the foundation and ensure that the post 100 will be vertically aligned in its installed configuration.

The pyramid shape of the base 102 ensures that the bottom of the base 102 that attaches to the foundation is wider than the top of the base, which attaches to the tube mast 104, thereby further enhancing the stability of the pole 100 in its assembled position. The steel chosen as a material for the base 102 makes the base 102 heavy, further enhancing stability of the post 100. In general, it is preferred that the weight of the base 102 exceeds the combined weight of the tube mast 104 and camera(s) 108, to increase the stability of the post 100 in its assembled position.

It is noted that the camera(s) 108 may be included in the post 100.

Figure 3:
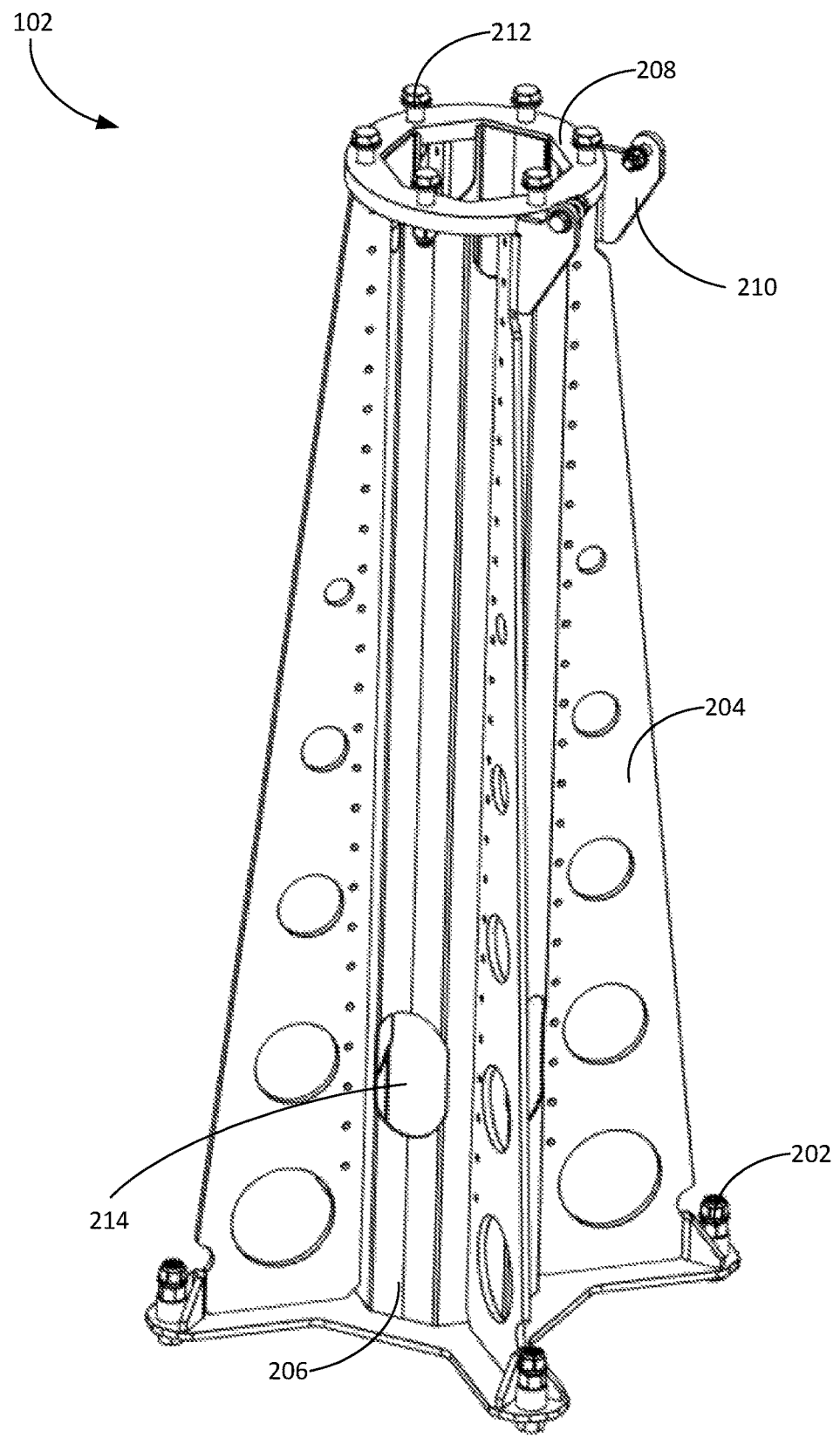
FIG. 3 is a perspective view of a base of the post in FIG. 1, in accordance with one embodiment.

FIG. 3 shows a more detailed perspective view of the base 102. As can be seen in FIG. 3, the base 102 has several flanges 204 arranged around on an envelope surface of a central base tube 206. Typically, the base 102 includes four flanges 204, although it should be realized that there could be fewer flanges 204, such as three, or more flanges 204, such as six or even eight. In addition to creating a stable base 102, the flanges 204 provide a convenient way of mounting the computing equipment, which generally has flat surfaces, to the base 102, which generally has a polygonal or round cross section and thus a curved envelope surface, as will be described in further detail below with reference to FIG. 4. Generally, the number of flanges 204 is limited by the size of the computing equipment, as the computing equipment typically sits in the space between the flanges 204, which will be described in further detail below. The exact number of flanges 204 can be determined by a person having ordinary skill in the art.

It should be noted that the central base tube 206 does not necessarily need to have an octagonal cross section, as shown in FIG. 3. There may be embodiments in which the cross section of the central base tube 206 may be round, square, rectangular, or hexagonal, for example. In some of these embodiments, the computing equipment may be mounted directly onto the envelope surface of the central base tube without the use of flanges 204. However, such configurations may possibly have a significant adverse impact on the stability of the post 100, as the base 102 would no longer have the stability created by the pyramid shape.

The top surface 208 of the base 102 is the surface against which the bottom of the tube mast 104 rests when the post 100 is assembled. The tube mast 104 is connected to the base 102 by a hinge 210, which allows the tube mast 104 to be folded down to a horizontal position for installation and service of cameras 108 and wiring, etc., which will be described in further detail below. In the assembled position, the tube mast 104 is secured to the base 102 by a set of attachment members 212, such as screws or nuts and bolts. Again, the choice of suitable attachment members lies well within the skills of the artisan.

In some embodiments, the hinge 210 may be located entirely within the cabinet 110 when the cabinet 110 is mounted on the base 102. In other embodiments, the hinge 210 may be located outside (i.e., above the top of) the cabinet 110. The most suitable location for the hinge 210 can be determined by the skilled person, based on the specific circumstances at hand.

The central base tube 206 also includes one or more through holes 214 that allow wiring to pass from the computing equipment into the central base tube 206 and up into the tube mast 104 to the camera mount 106. In addition, the through holes 214 also serve as air passages, which aides with creating an airflow around the computing equipment and cooling the computing equipment to an appropriate operating temperature, as will be described in further detail below.

Figure 4:
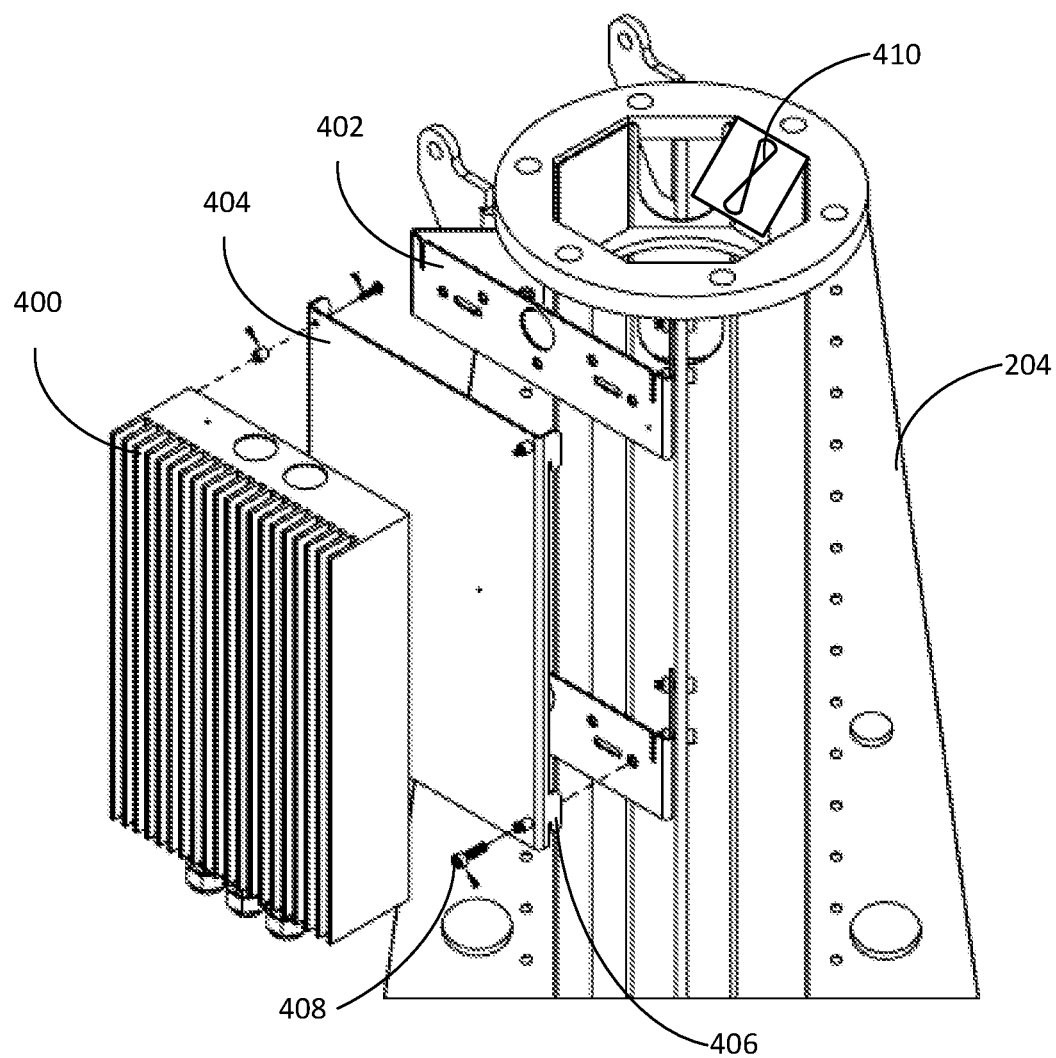
FIG. 4 is a perspective view showing how computing equipment is installed in a base of the post in FIG. 1, in accordance with one embodiment.

FIG. 4 is a perspective view showing how computing equipment 400 is installed in a base of the post in FIG. 1, in accordance with one embodiment. As can be seen in FIG. 4, computing equipment 400 can be installed onto the base 102, using one or more brackets 402 that attach to the flanges 204, and to which a plate 404 can be connected, which can hold various types of computing equipment 400. Generally, each bracket 402 is connected to two flanges 204 to create a secure connection for the plate 404. FIG. 4 shows an embodiment in which the plate 404 attaches to the computing equipment 400 and is equipped with hooks 406 such that the plate can hook on to the brackets 402 and be secured by a locking screw 408 to prevent accidental unhooking of the plate 404. It should, however, be realized that in some embodiments, there may be no need for a plate 404, and that in some embodiments there may be brackets 402 that are designed to be connected on a single flange 204 only. These are all design choices that can be made by the skilled artisan, based on the specific circumstances at hand. Wiring to and from the computing equipment 400 passes through the through holes 214 into the central base tube 206 and up into the tube mast 104, as discussed above with respect to FIG. 3.

As noted above, the available space between the flanges 204 typically determine the size of the computing equipment 400 that can be installed in the base 102. It should further be noted that although only one piece of computing equipment 400 is shown in FIG. 4, there can be additional pieces of computing equipment 400 installed between the other pairs of flanges 204, such that the configuration shown in FIG. 4 could contain anywhere between one and four pieces of computing equipment, or even more, which may serve the same or different purposes.

Generally, the cabinet 110 has a footprint of at least 500 mm by 500 mm and a height of at least 1300 mm. Again, however, it should be realized that the exact dimensions of the cabinet and the shape of the footprint can vary based on the dimensions of the base and what type of computing equipment that sits inside the cabinet 110.

Figure 5:
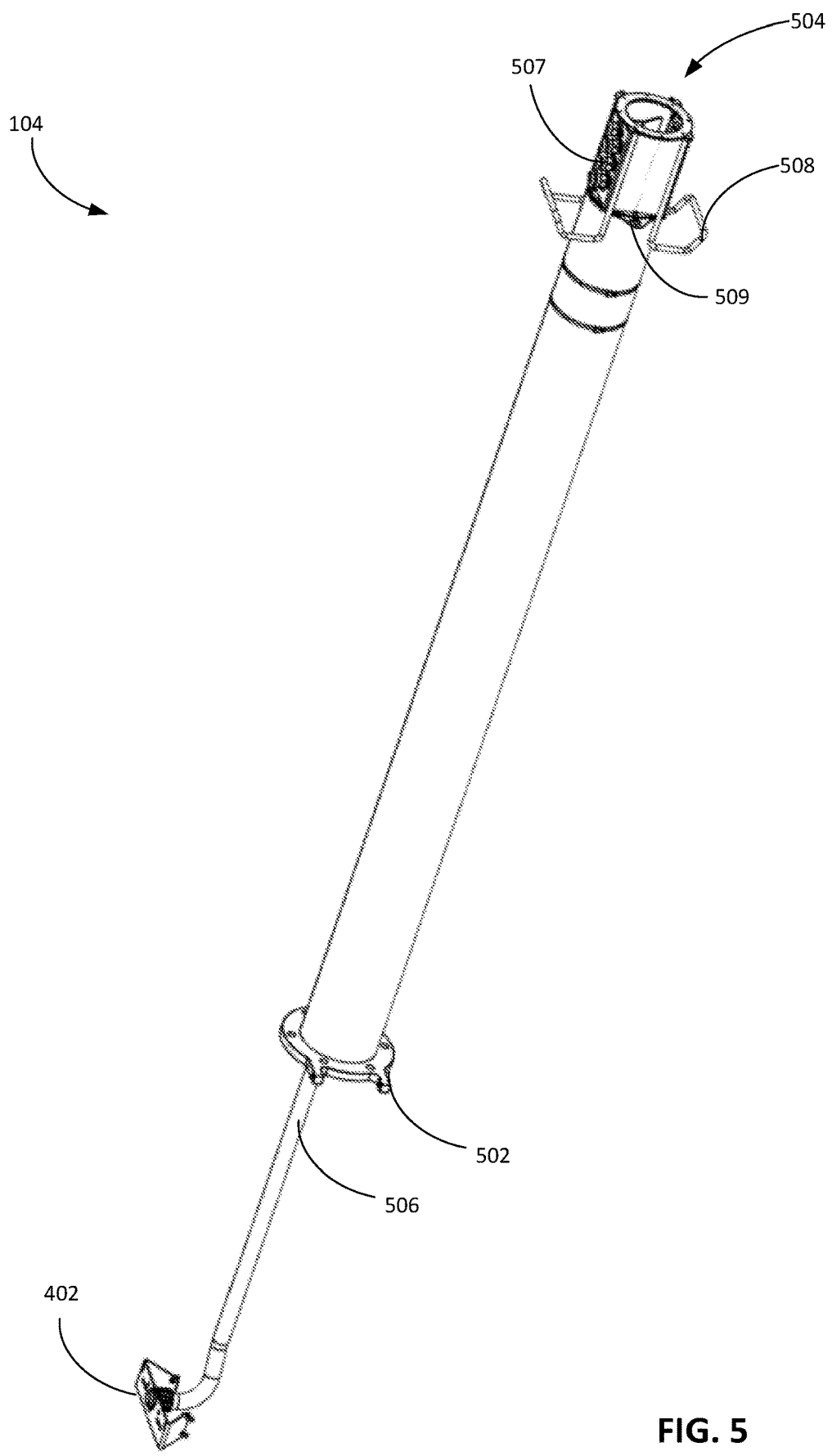
FIG. 5 is a perspective view of a tube mast, in accordance with one embodiment.

FIG. 5 is a perspective view of a tube mast 104 in accordance with one embodiment. As can be seen in FIG. 5, the tube mast 104 has a proximal end 502 which is arranged to connect to the hinge 210 and be secured to the top surface 208 of the base 102, using the attachment members 212. The tube mast 104 has a distal end 504. At the distal end 504 there is an optional connection piece 507 to which the camera mount 106 is connected in the assembled position. The connection piece 507 can either be a separate component that is attached to the tube mast 104 or be integrated into the tube mast 104 itself. In some embodiments, no connection piece 507 is needed, as the wiring can run straight to the cameras.

Inside the tube mast 104, there is a conduit 506 that reaches down into the central base tube 206, inside which the AC wiring runs from the base to the camera mount 106. In the embodiment illustrated in FIG. 5, the remaining wiring for the cameras (e.g., ethernet cable(s), coaxial cable(s), and the like) runs freely inside the tube mast 104.

It is realized that the central base tube 206 is not shown in FIG. 5, but that the central base tube 206 and the tube mast 104 together may form a connected, cylinder-shaped, hollow body when the post 100 is in a fully mounted state with the tube mast 104 fully folded up by the hinges 210.

As was mentioned above, connecting the tube mast 104 to the base 102 via hinges 210 allows the tube mast 104 to be folded down to the ground in an essential horizontal position during installation or repair. This is an important feature, as the post 100 often can be upwards eight meters high and performing installations at such a height might provide hazardous working conditions. In addition, it is simpler to perform installations at ground level and then raising the tube mast 104, compared to having to configure the post 100 in a vertical position. When the hinges 210 are fully enclosed by the mounted cabinet 110, the post 100 cannot be folded to the ground without first accessing and opening the cabinet 110.

In the illustrated embodiment, the tube mast 104 is made of thin steel. This allows the tube mast 104 to be easy to manipulate during installation and repair, while at the same time being sufficiently strong to support the weight of the cameras, yet not so heavy that the stability of the post is compromised, even during high winds. However, it should also be noted that there are other embodiments in which light-weight materials, such as aluminium, plastic, carbon fiber, filament-wound glass fiber or other composite material may be used and that there are many options for a tube mast material that can be chosen, and which can be selected by a person having ordinary skill in the art. Stability is important in the present applications for golf cameras, since the orientation of such cameras is crucial for obtaining high-quality readings of golf shots. In general, the cameras 108 may be arranged to depict free-flying golf balls with an accuracy high enough so as to be able to determine a position and trajectory of such golf balls based on the captured imagery.

As was mentioned above, the base 102 is provided with one or more through holes 214 that serve as air passages. Similarly, the distal end 504 of the tube mast 104 is provided with set of ventilation holes (not shown). This allows an upwards airflow from the base 102 through the tube mast 104, which achieves passive cooling of the computing equipment 400 in the base 102. This passive cooling is often further enhanced by a "chimney effect" created as the air Inside the tube mast 104 heats up and rises towards the distal end 504.

In some circumstances, the passive cooling may not be sufficient, and in those cases, the post 100 can be equipped with a fan 410 arranged to provide active cooling by forcing an upwards airflow from the base 102 through the tube mast 104 to actively cool the computing equipment 400. Depending on the specific embodiment at hand, the fan 410 can be installed in the base 102 or in the distal end 504 of the tube mast 104. Regardless of the specific position of the fan 410, the same effect of moving cooler air from the bottom of the post 100 towards the top of the post 100, and thereby cooling the computing equipment 400, can be achieved.

In the embodiment shown in FIG. 5, the tube mast 104 is also equipped with two ladder rails 508 on opposite sides, which each can be used to attach a ladder to the tube mast 104 for those occasions where it is not feasible for various reasons to fold the tube mast 104 into a horizontal position for installation, repair, and/or adjustment of camera equipment. FIG. 5 further shows a hook 509 that can be used by a technician to attach a safety harness while working on the ladder, for extra safety. A corresponding hook 509 is located on the opposite side, but not visible in FIG. 5.

Figure 6:
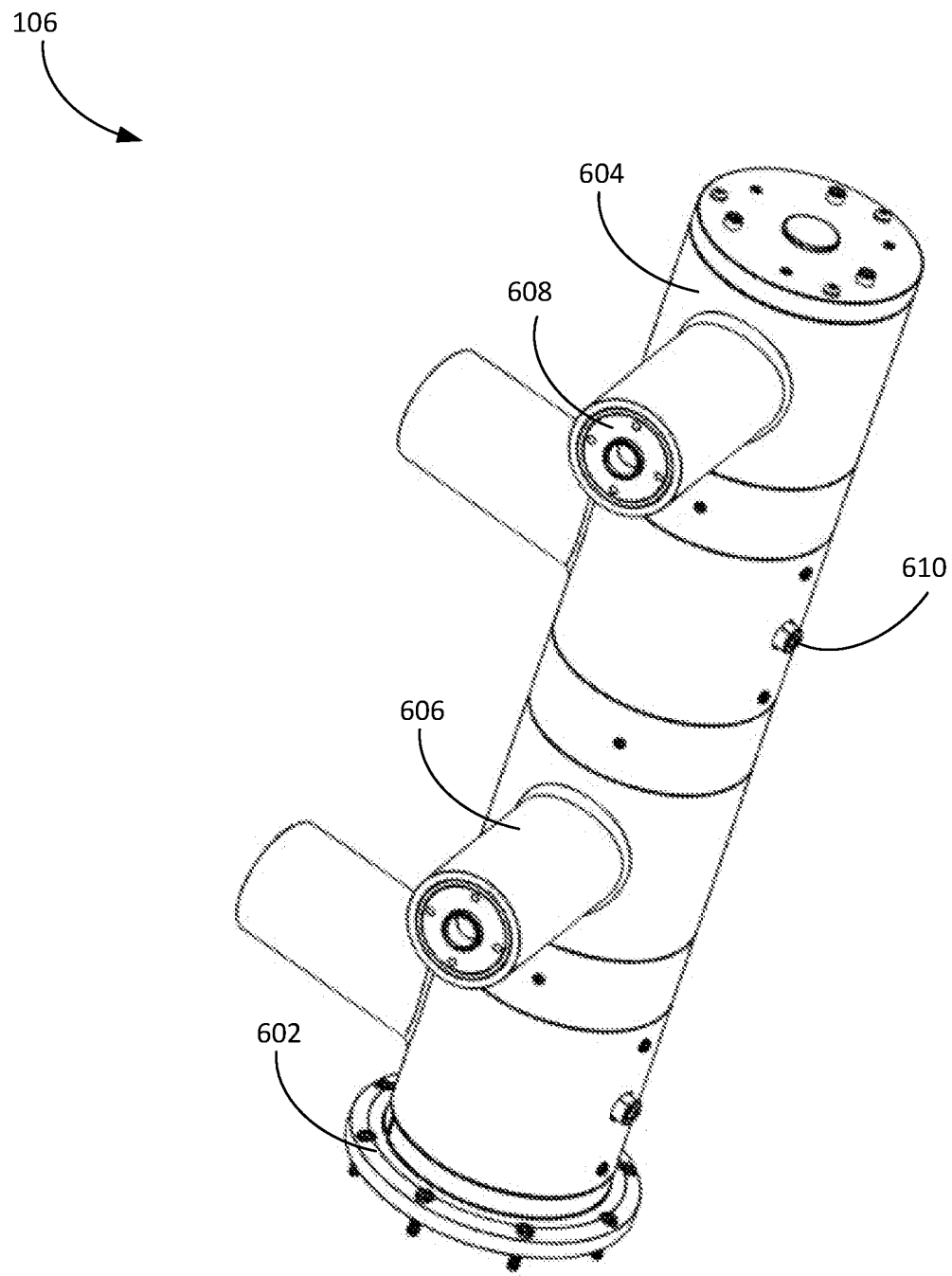
FIG. 6 is a perspective view of a camera mount, in accordance with one embodiment.

FIG. 6 is a perspective view of a camera mount 106, in accordance with one embodiment. As can be seen in FIG. 6, the camera mount 106 includes a base 602 that attaches to the connection piece 507 at the distal end 504 of the tube mast 104 when the post 100 is in its assembled configuration. The camera mount 106 includes several rotating members 604 that can rotate around a central longitudinal axis of the camera mount 106, which coincides with the central vertical axis of the post 100.

Each rotating member 604 has an attached tilt member 608 having a central axis that may be perpendicular to the central axis of the camera mount 106, and around which axis the tilt member 608 can rotate. The tilt member 606 is held snugly in place against the rotating member 604 by a tilt member locking screw 610, which is aligned with the central axis of the tilt member 608 and reaches across to the opposite side of the rotating member 604, pulling the tilt member 608 towards the rotating member 604.

Figure 7:
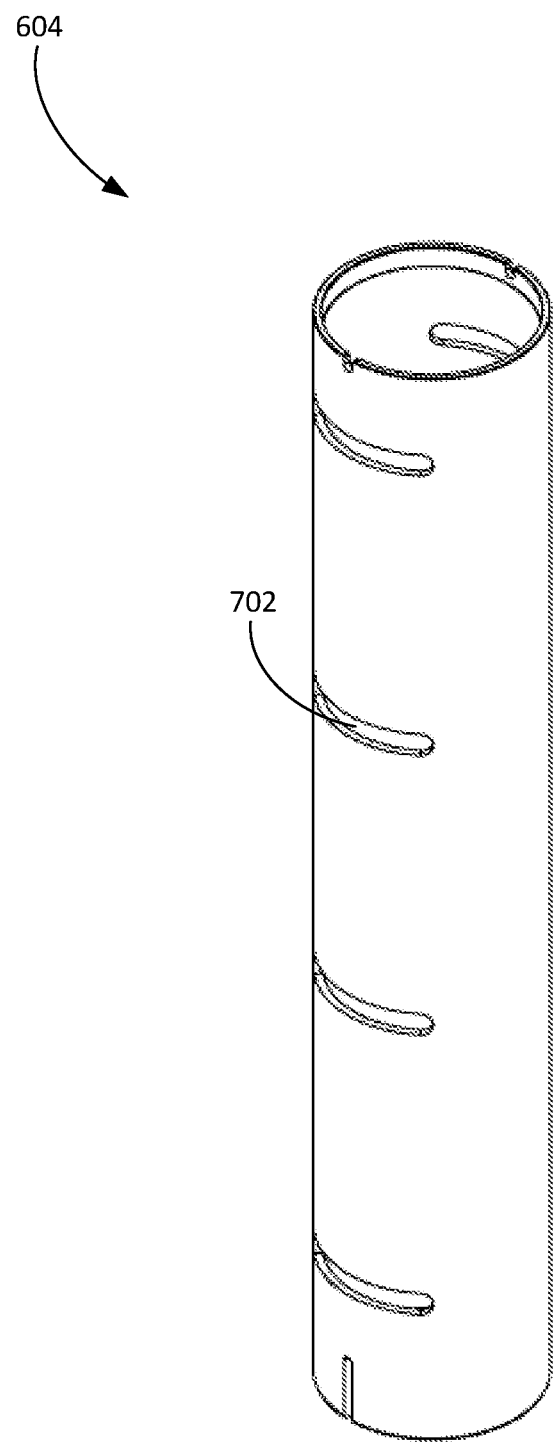
FIG. 7 is a perspective view of an internal portion of a camera mount, in accordance with one embodiment.

The locking screws 610 goes through the rotating member 604 through slits 702 made in the rotating member, as shown in FIG. 7. When the locking screw 610 is inserted through the slits 702 to hold the tilting member 608 in place, the slits 702 effectively limit how far the rotating member 604 can turn around the central axis of the post 100. Typically, the slits 702 are sized such that a rotation of approximately +/−40 degrees is possible for the rotating member 604, but it should be realized that the width of the slits 702 may be varied such that larger or smaller degrees of rotation is possible. Further, it should be realized that the placements of the slits 702 can be offset for different rotating members 604. For example, if a second slit 702 is offset from a first slit by 40 degrees, the combined degree of movement for the corresponding two rotating members 604 would be 120 degrees (compared to an 80-degree span for a single rotating member). Again, many variations can be accomplished by the skilled artisan.

Returning now to FIG. 6, the distal end 608 of each tilt member 606 includes hardware for mounting a camera 108. With this configuration, it is possible to achieve a setup in which each camera 108 can be rotated and/or tilted so it can point in any horizontal and vertical direction to obtain a good view of the environment, e.g., a driving range or similar area at a golf course from or past where golf balls are shot and depicted by the camera 108.

Preferably, the hardware for mounting the cameras 108 is designed such that the cameras 108 are friction mounted and will not move after they have been installed as a result of external forces, for example, from wind, hail, branches falling on the cameras or animals sitting on the cameras, etc., and to maintain a consistent field of view. It should be noted that while four cameras 108 are represented in the drawings, the same principles are applicable to fewer or more cameras 108, as long as the stability of the post 100 is not compromised in any way. The outside of the rotating members 604 and tilting members 606 can in some embodiments be provided with gradations so it is possible for a technician to know how much the camera 108 is being rotated or tilted, which may facilitate installation and tuning processes. It should be noted in this context that while the illustrated embodiments are based on manually adjusting the cameras 108, there may be other embodiments in which the adjusting is done mechanically, for example, by step motors that can be controlled remotely to cause the cameras 108 to point in certain directions. The step motors can be controlled by a technician through a graphical user interface on a computer, for example.

Finally, returning to FIG. 1, as was described above, the base is encased by a cabinet 110. In some embodiments, the cabinet 110 has two or more sections (typically two halves), allowing the cabinet 110 to be wrapped around the base 102 and tube mast 104 after they have been attached to one another. The sections of the cabinet 110 are configured to be securely attached to one another, for example by a lock, to prevent the cabinet 110 from being opened unintentionally. The cabinet 100 creates a protected environment around the computing equipment 400, while at the same time being easy to open for service purposes and difficult to break into by people or animals. It should be noted that while the cabinet 110 illustrated in FIG. 1 has a square footprint, it may have essentially any shape, as long as it can encapsulate the base 102 and computing equipment and wrap around the tube mast 104.

In some embodiments, a periphery sealing gasket (not shown) is arranged between the tube mast 104 and the cabinet 110 to prevent or at least deflect moisture from running down the length of the tube mast 104 to the inside of the cabinet 110 and into the base 102 where it may damage the computing equipment 400. As the post 100 typically is installed in an outdoor environment, were there may be rain and/or snow from time to time, it is preferred that the inside of the cabinet 100 remains protected from the weather, even in situations where the computer equipment 400 itself may be rated to withstand a certain amount of moisture. A periphery sealing gasket between the tube mast 104 and cabinet 100 can serve this purpose and may be clamped by the respective subparts of the cabinet 110. Further, if any moisture were to enter the cabinet 110, despite the use of the periphery sealing gasket, such moisture would dry up quickly due to the air circulation through the post 100, as described above.

It will be appreciated that a person skilled in the art can modify the above-described embodiments in many ways and still use the advantages of the invention as shown in the embodiments above. For example, while the invention has been described in the context of a post for mounting a camera outdoors, the post can also be used in various types of indoor environments. The post can also be used for mounting other types of equipment than cameras, which may be used by itself or in combination with the cameras. Examples of such equipment can include radar equipment, lighting equipment for illuminating the area around the post, and speakers (which can be used, for example, for deterring animals).

Some embodiments also include Wi-Fi access points and/or mobile antennas at the top of the post 100. Thus, the invention should not be limited to the shown embodiments but should only be defined by the appended claims. Additionally, as the skilled person understands, the shown embodiments may be combined.

What is claimed is:

1. A post for mounting electronic equipment, which post comprises a base, a tube mast, and a mount arranged to hold electronic equipment, wherein a proximal end of the tube mast is connected to the base and a distal end of the tube mast is connected to the mount, characterized in that
    the base is arranged to comprise computing equipment, from which computing equipment wiring runs through the tube mast to the mount,
    the base and computing equipment are encased by a cabinet configured to protect the computing equipment from exposure to weather,
    the proximal end of the tube mast is connected to the base via hinges, allowing folding of the tube mast relative to the base, and
    wherein the base comprises two or more flanges, the two or more flanges being arranged around a central base tube and tapering off along the height of the base, and wherein the computing equipment is arranged to be mounted onto a pair of the two or more flanges.

2. A post according to claim 1, wherein the base comprises four flanges.

3. A post according to claim 1, wherein the flanges are arranged to hold the computing equipment via brackets.

4. A post according to claim 3, wherein the brackets of at least one piece of the computing equipment are arranged to be mounted onto two adjacent flanges.

5. A post according to claim 1, wherein the central base tube and the tube mast form a continuous tube for the wiring from the computing equipment to the mount.

6. A post according to claim 1, wherein the central base tube further comprises through holes for wiring connecting to the computing equipment.

7. A post according to claim 1, wherein the two or more flanges are provided on an envelope surface of the central base tube.

8. A post for mounting electronic equipment, which post comprises a base, a tube mast, and a mount arranged to hold electronic equipment, wherein a proximal end of the tube mast is connected to the base and a distal end of the tube mast is connected to the mount, characterized in that
    the base is arranged to comprise computing equipment, from which computing equipment wiring runs through the tube mast to the mount,
    the base and computing equipment are encased by a cabinet configured to protect the computing equipment from exposure to weather,
    the proximal end of the tube mast is connected to the base via hinges, allowing folding of the tube mast relative to the base, and
    wherein the cabinet has two or more sections, allowing the cabinet to be wrapped around the base and tube mast, and wherein the two or more sections are configured to be securely attached to one another to prevent unintentional opening of the cabinet, comprising the steps of:
    installing and levelling the base onto a foundation;
    attaching the proximal end of the tube mast to the base;
    connecting the electronic equipment to the wiring;
    characterised in that the electronic equipment and the wiring are connected while the tube mast is resting on the ground in an essentially horizontal position, and further comprising the steps of:
    raising the tube mast to a vertical position;
    installing computing equipment at the base and connecting the computing equipment to the wiring; and
    encasing the base and computing equipment by the cabinet.

* * * * *